US009252907B2

(12) United States Patent
Bhattad et al.

(10) Patent No.: US 9,252,907 B2
(45) Date of Patent: Feb. 2, 2016

(54) METHODS AND APPARATUS FOR PROVIDING MULTI-ANTENNA ENHANCEMENTS USING MULTIPLE PROCESSING UNITS

(71) Applicant: QUALCOMM Incorporated, San Diego, CA (US)

(72) Inventors: Kapil Bhattad, Bangalore (IN); Dinesh Krithivasan, Bangalore (IN); Dhananjay Ashok Gore, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 240 days.

(21) Appl. No.: 14/025,495

(22) Filed: Sep. 12, 2013

(65) Prior Publication Data

US 2014/0078880 A1 Mar. 20, 2014

Related U.S. Application Data

(60) Provisional application No. 61/701,157, filed on Sep. 14, 2012.

(51) Int. Cl.
*H04L 12/28* (2006.01)
*H04J 11/00* (2006.01)
*H04B 7/04* (2006.01)
(Continued)

(52) U.S. Cl.
CPC .............. *H04J 11/00* (2013.01); *H04B 7/0413* (2013.01); *H04B 7/0854* (2013.01); *H04B 7/0871* (2013.01); *H04B 7/0885* (2013.01); *H04B 7/0802* (2013.01); *H04B 7/086* (2013.01);
(Continued)

(58) Field of Classification Search
CPC ..... H04J 11/00; H04B 7/0413; H04B 7/0854; H04B 7/0871; H04B 7/0885; H04B 7/0802; H04B 7/086; H04L 5/0048; H04L 5/0053; H04L 1/0026; H04L 1/1812
See application file for complete search history.

(56) References Cited

U.S. PATENT DOCUMENTS 8,774,304 B1 * 7/2014 Zhang et al. .................. 375/267
2003/0083016 A1 * 5/2003 Evans et al. .................. 455/67.1
(Continued)

FOREIGN PATENT DOCUMENTS

WO WO-03030403 A1 4/2003
WO WO-2005125250 A1 12/2005
(Continued)

OTHER PUBLICATIONS

International Search Report and Written Opinion—PCT/US2013/059684—ISA/EPO—Feb. 21, 2014.
(Continued)

*Primary Examiner* — Robert Wilson
(74) *Attorney, Agent, or Firm* — Patterson & Sheridan, LLP

(57) ABSTRACT

Certain aspects of the present disclosure relate to techniques for providing multi-antenna enhancements using multiple processing units. A UE (User Equipment) may receive data via three or more antennas. The UE may determine a number of independent processing units to be employed to process the data, wherein the determined number of independent processing units includes at least two processing units and at least one processing unit jointly processes at least two streams of data. The data may be processed by the determined number of independent processing units and the results of the processing units may be combined.

30 Claims, 12 Drawing Sheets

(51) Int. Cl.
*H04B 7/08* (2006.01)
*H04L 5/00* (2006.01)
*H04L 1/00* (2006.01)
*H04L 1/18* (2006.01)

(52) U.S. Cl.
CPC ............. *H04L1/0026* (2013.01); *H04L 1/1812* (2013.01); *H04L 5/0048* (2013.01); *H04L 5/0053* (2013.01)

(56) References Cited

U.S. PATENT DOCUMENTS

| | | | |
|---|---|---|---|
| 2004/0185904 A1 | 9/2004 | Yamakita | |
| 2005/0243780 A1* | 11/2005 | Trainin et al. | 370/338 |
| 2006/0062322 A1 | 3/2006 | Namgoong et al. | |
| 2006/0209749 A1* | 9/2006 | Blanz et al. | 370/328 |
| 2006/0285523 A1* | 12/2006 | Ishii et al. | 370/335 |
| 2008/0095257 A1* | 4/2008 | Maeda et al. | 375/262 |
| 2008/0112499 A1* | 5/2008 | Bennett | 375/267 |
| 2010/0080320 A1 | 4/2010 | Yano et al. | |
| 2011/0077038 A1* | 3/2011 | Montojo et al. | 455/507 |
| 2012/0147842 A1* | 6/2012 | Sato | 370/329 |
| 2012/0230380 A1 | 9/2012 | Keusgen et al. | |
| 2014/0078880 A1* | 3/2014 | Bhattad et al. | 370/203 |

FOREIGN PATENT DOCUMENTS

| | | |
|---|---|---|
| WO | WO-2008028942 A1 | 3/2008 |
| WO | WO-2011084715 A1 | 7/2011 |

OTHER PUBLICATIONS

Partial International Search Report—PCT/US2013/059684—ISA/EPO—Nov. 22, 2013.

* cited by examiner

US 9,252,907 B2

METHODS AND APPARATUS FOR PROVIDING MULTI-ANTENNA ENHANCEMENTS USING MULTIPLE PROCESSING UNITS

CLAIM OF PRIORITY UNDER 35 U.S.C. §119

The present Application for Patent claims priority to U.S. Provisional Application No. 61/701,157, entitled METHODS AND APPARATUS FOR PROVIDING MULTI-ANTENNA ENHANCEMENTS USING MULTIPLE PROCESSING UNITS, filed Sep. 14, 2012, and assigned to the assignee hereof and hereby expressly incorporated by reference herein.

FIELD

The present disclosure relates generally to communication systems, and more particularly, to a method and apparatus for providing multi-antenna enhancements using multiple processing units.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment (UE). The method generally may includes receiving data via three or more antennas, determining a number of independent processing units to be employed to process the data, wherein the determined number of independent processing units comprises at least two processing units and at least one processing unit jointly processes at least two streams of data, processing the data by the determined number of independent processing units, and combining results of the processing units.

Certain aspects of the present disclosure provide an apparatus for wireless communications. The apparatus generally includes at least one processor and a memory coupled to the at least one processor. The processor may be configured to receive data via three or more antennas, determine a number of independent processing units to be employed to process the data, wherein the determined number of independent processing units comprises at least two processing units and at least one processing unit jointly processes at least two streams of data, process the data by the determined number of independent processing units and combine results of the processing units.

Certain aspects of the present disclosure provide an apparatus for wireless communications. The apparatus generally includes means for receiving data via three or more antennas, means for determining a number of independent processing units to be employed to process the data, wherein the determined number of independent processing units comprises at least two processing units and at least one processing unit jointly processes at least two streams of data, means for processing the data by the determined number of independent processing units, and means for combining results of the processing units.

Certain aspects of the present disclosure provide a computer program product for wireless communications. The computer program product generally includes a computer-readable medium comprising code for receiving data via three or more antennas, determining a number of independent processing units to be employed to process the data, wherein the determined number of independent processing units comprises at least two processing units and at least one processing unit jointly processes at least two streams of data, processing the data by the determined number of independent processing units, and combining results of the processing units.

DETAILED DESCRIPTION

Figure 1:
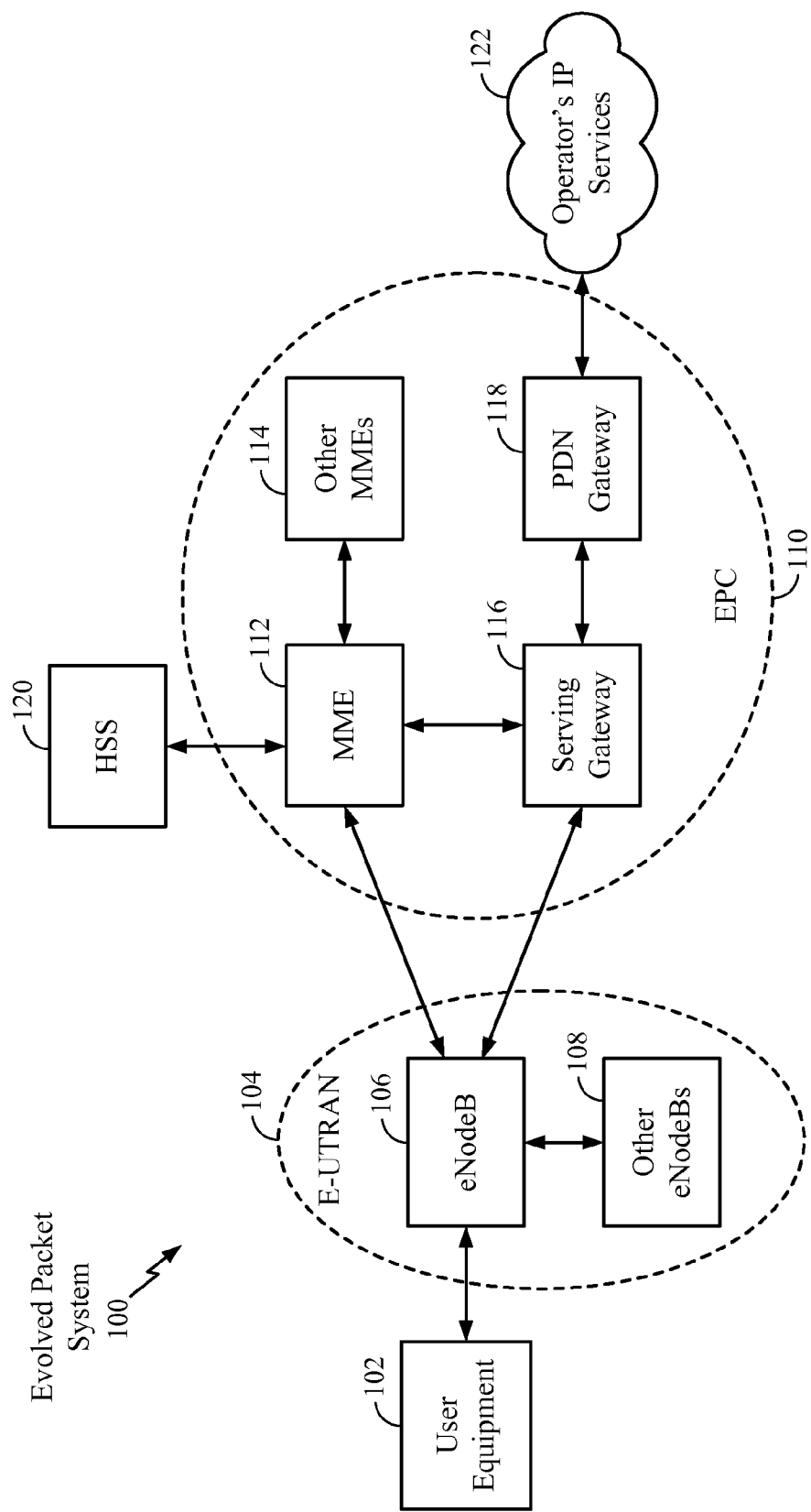
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS Streaming Service (PSS). In this manner, the UE 102 may be coupled to the PDN through the LTE network.

Figure 2:
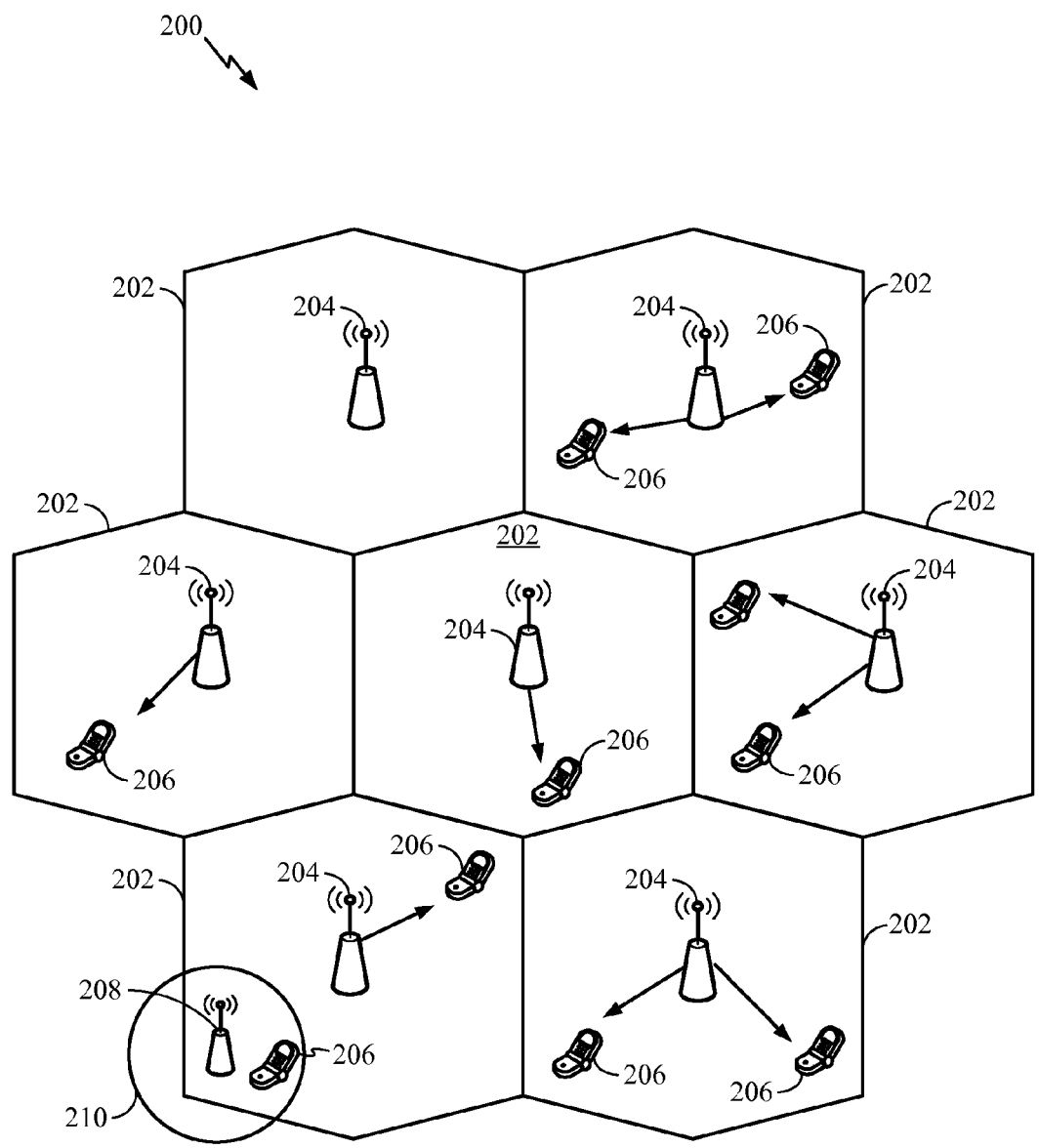
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
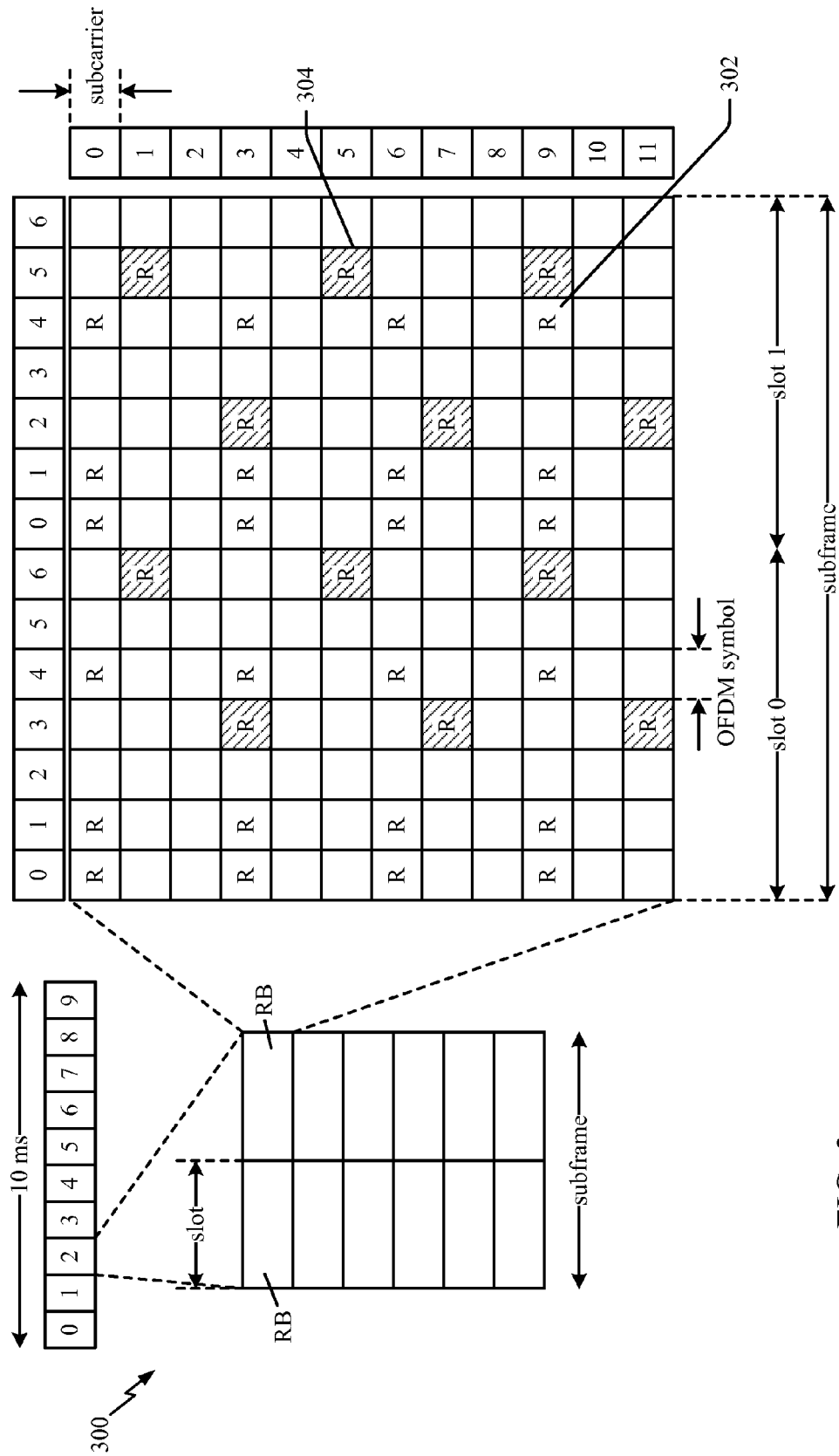
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
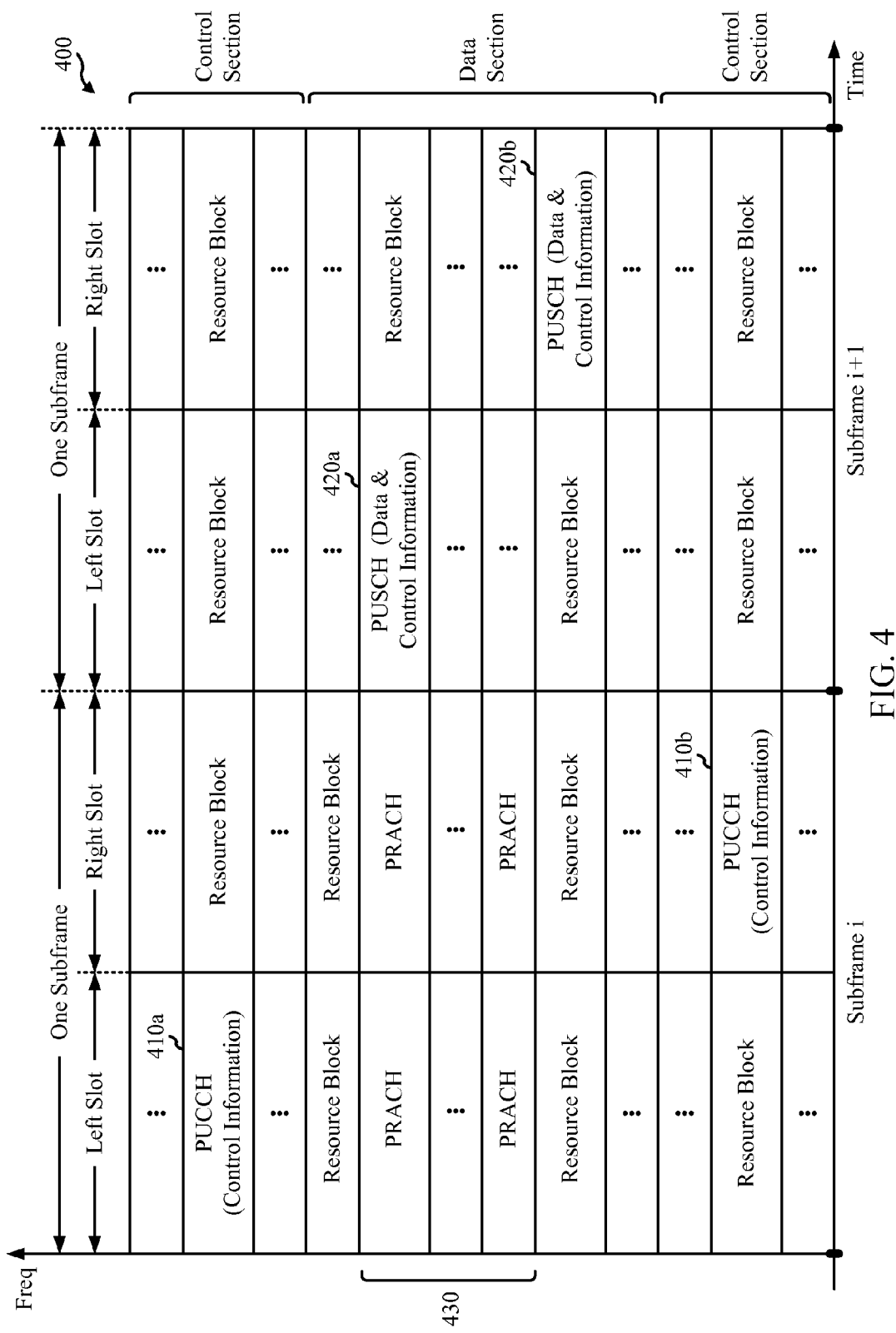
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
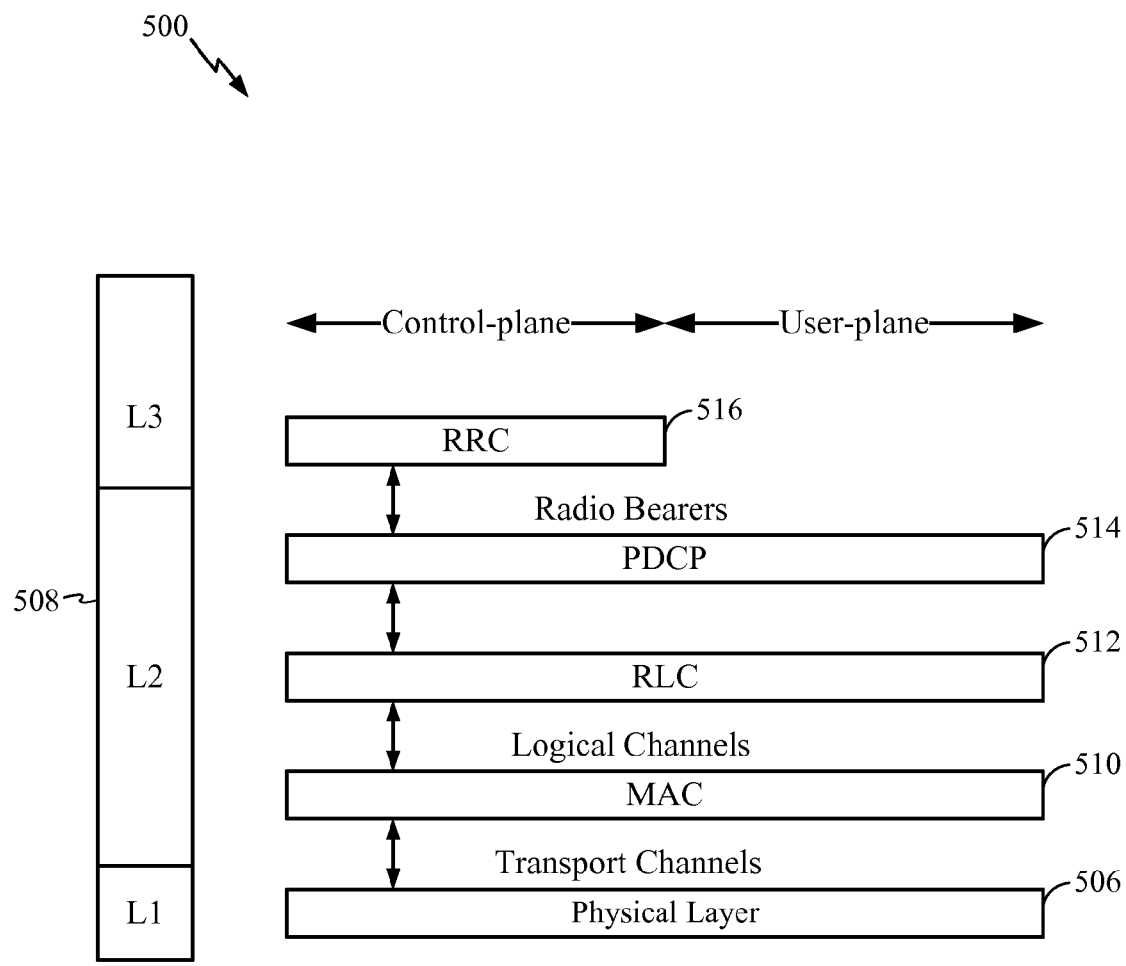
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
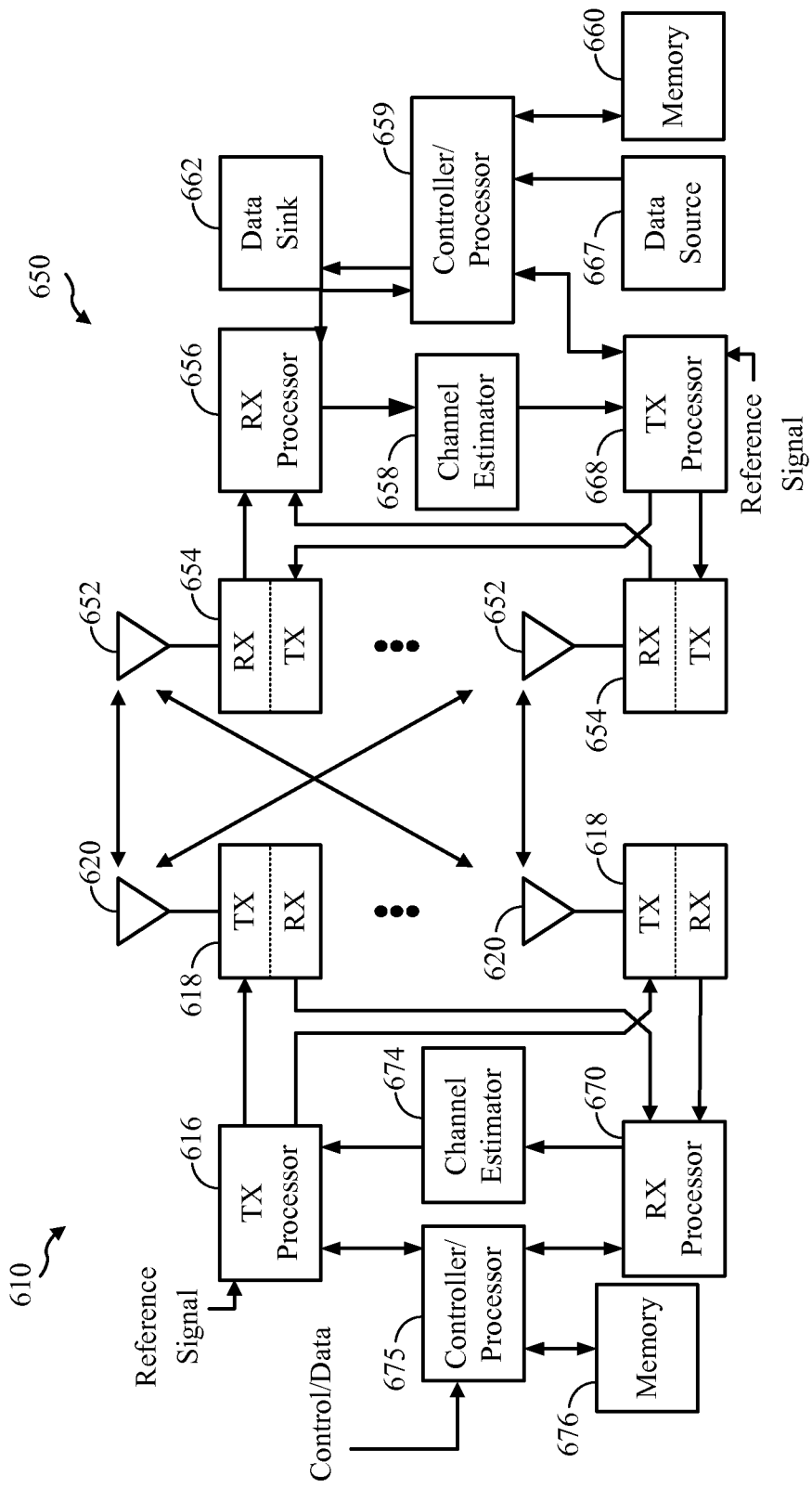
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
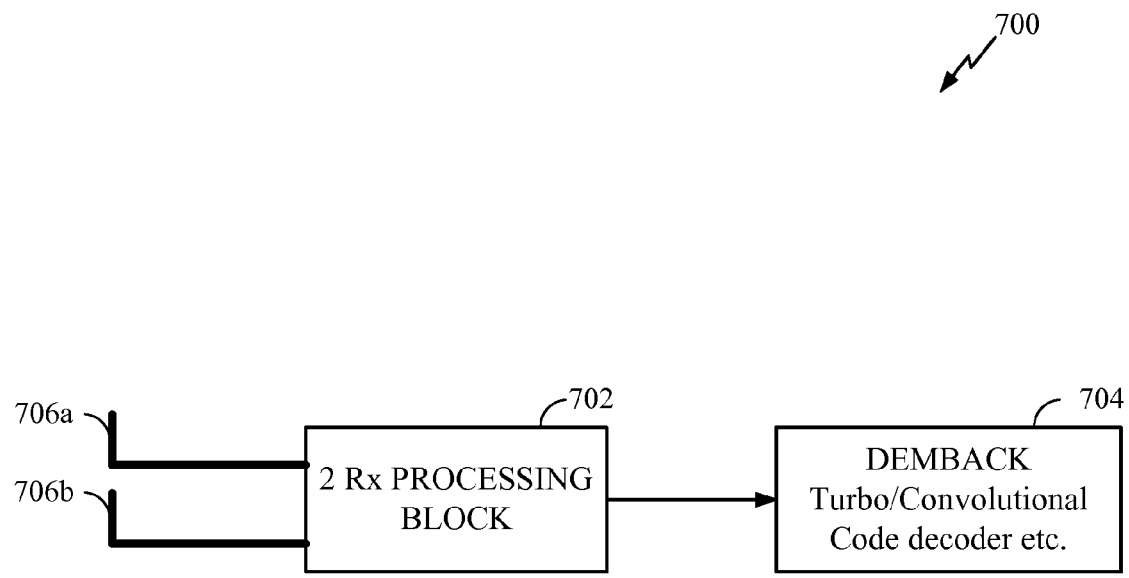
FIG. 7 illustrates a typical receive processing apparatus at a receiver in a wireless communication systems, in accordance with certain aspects of the present disclosure.

Example Methods and Apparatus for Providing Multi-Antenna Enhancements Using Multiple Processing Units FIG. 7 illustrates a typical receive processing apparatus 700 at a receiver (e.g. UE 206 in FIG. 2 or 650 in FIG. 6) in a wireless communication systems, in accordance with certain aspects of the present disclosure. Generally, a front end processing block 702 may include MIMO demodulators such as MMSE (Maximum Mean Square Error) demodulation. A backend processing block 704 may include a Turbo/convolutional code decoder.

In a typical transmitter, data is encoded into modulation symbols. The modulation symbols are then mapped to one or more transmit antennas and then transmitted. At a receiver, each receive antenna receives a sum of the modulation symbols transmitted by all the transmit antennas at the transmitter end. Thus, the receiver knows that each received signal is a linear combination of the transmitted modulation symbols. The receiver then attempts to determine an estimate of the transmitted modulation symbols (e.g. soft estimates of the modulation symbols). From the estimated modulation symbols the receiver may compute LLRs (Log Likelihood Ratios) and may perform error correction to determine the transmitted symbols.

Standard LTE chips may support processing for only two receive antennas (2Rx Processing). As shown in FIG. 7, the front end processing block 702 supports processing for two antennas 706*a* and 706*b*. For example, the MMSE routines at the front end block 702 may support processing only for 2Rx antennas. In certain aspects, performance of the receiver may be enhanced by increasing the number of receive antennas that receive the same modulation symbols from the transmitter. However, in order for the receiver to support processing for the increased number of antennas, new MMSE routines may have to be written to support the additional processing. This may not be feasible and the processing hardware at the receiver may not support such processing of the additional receiver chains. Thus, there is a need to achieve gains from using additional antennas by using the standard processing chips.

In certain aspects, additional receive antennas may be used at a receiver and multiple standard processing blocks may be employed to process data received from all of the receive antennas (including the additional receive antennas). For example, independent 2Rx processing may be performed for each pair of antennas using two different standard 2RX processing chips. In certain aspects, a single 2Rx processing may be reused to perform 2RX processing for all pair of antennas one after another.

Figure 8:
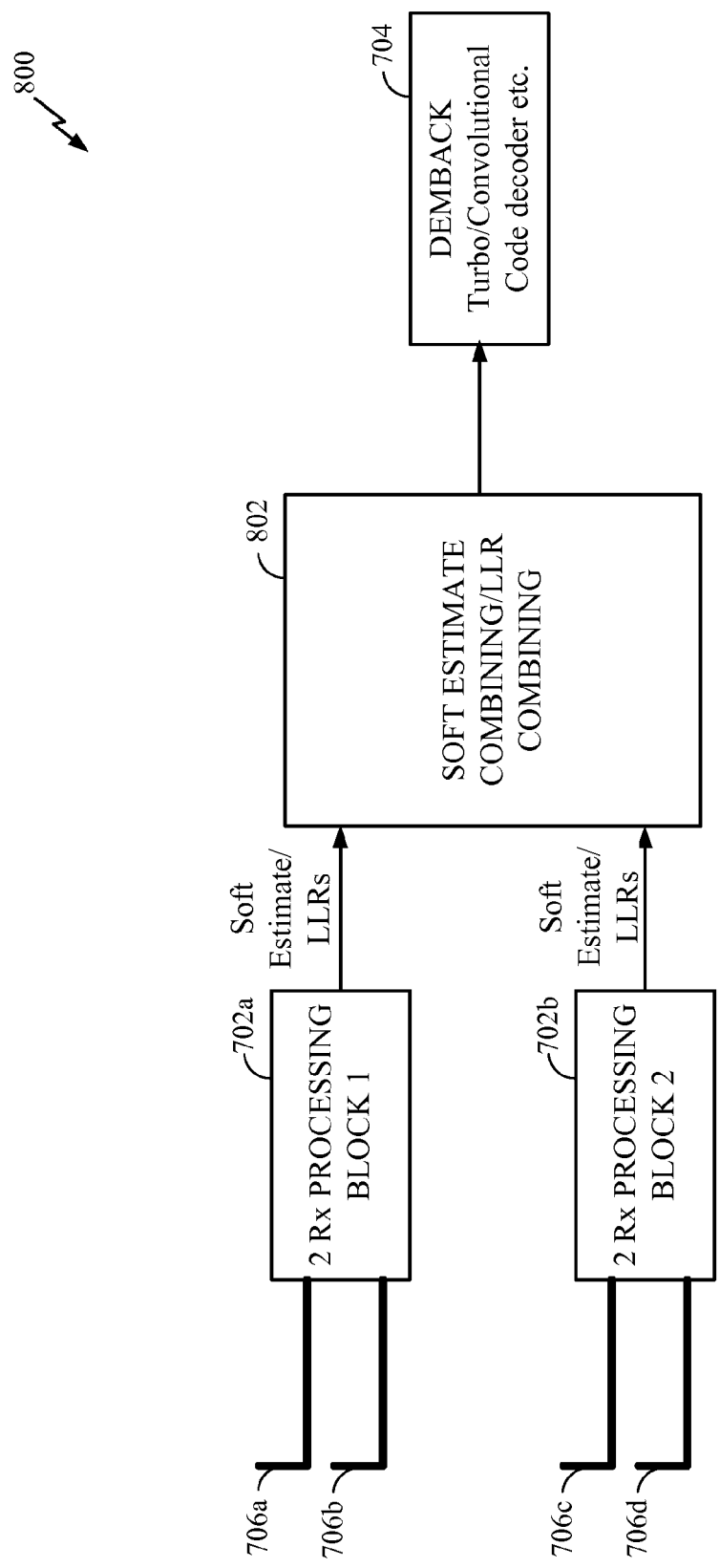
FIG. 8 illustrates receiver processing apparatus which utilizes additional receive antennas using smaller MIMO processing blocks, in accordance with certain aspects of the present disclosure.

FIG. 8 illustrates receiver processing apparatus 800 which utilizes additional receive antennas using smaller MIMO processing blocks, in accordance with certain aspects of the present disclosure. As shown in FIG. 8, the processing apparatus 800 includes four receive antennas 706a-706d and two front end processing blocks 702a and 702b, each capable of independently processing data received from at most two receive antennas. Processing block 702a may process data received from antennas 706a and 706b and processing block 702b may process data received from antennas 706c and 706b.

In an aspect, if the 2RX processing blocks 702a and 702b use MMSE processing, each 2RX processing block may output soft estimates of the transmitted modulation symbols or LLRs for the bits. In an aspect, each of the antennas 706a-706d may receive the same modulation symbols from a transmitter, and both the processing blocks 702a and 702b may provide soft estimates or LLRs for the same symbols or bits respectively. The soft estimates/LLRs may be combined before the decoding stage 704 (e.g., by processing block 802) in order to get a better estimate of the modulation symbols. It may be noted that the soft estimates here refer to estimates of the modulation symbol(s), while LLRs refer to log-likelihood ratios of the bits that comprise the modulation symbol(s).

In certain aspects, according to a first approach for the combining, all soft symbol outputs may be converted to LLRs for individual bits and the output LLR of a bit may be obtained by adding the LLRs obtained from each processing block (e.g., 702a, 702b). In alternative aspects, according to a second approach for the combining, the soft symbol estimates obtained from processing blocks 702a and 702b (such as MMSE) may be combined and then the output LLRs for each bit may be obtained directly.

In certain aspects, quality of the two receive chains may be considered while combining the soft estimates/LLRs from the receive chains. For example, each soft symbol may be associated with an SNR, and an SNR estimate may be used for MRC combining (Maximum Ratio Combining) of the soft estimates. In an aspect, receive chains with better SNR estimates may be given higher weight while combining.

In certain aspects, the second approach to combining may have lower complexity as LLR computation is done only once. Moreover, the LLR computation typically involves an array of non-trivial operations (e.g. exponents) which are typically implemented using approximations. Ideally, if the LLRs are accurate, combining the LLRs of the bits may be as good as combining the soft symbol estimates. However, the determined LLRs are generally non-optimal (inaccurate). Thus, LLR combining may not be as good as soft symbol combining. Thus, the second approach may be expected to have better performance if the soft symbol to LLR computation is not done optimally.

Thus, by using the processing apparatus 800, gains associated with 4 Rx antennas may be achieved without using chips capable of 4Rx processing.

In certain aspects, certain modems at receivers may support multiple carriers. For example, a modem may be configured to receive data on a first carrier managed by a first network operator using a first pair of antennas and receive data on a second carrier managed by a second network operator using a second pair of antennas. In certain aspects, if the receiver, for certain cases, needs to receive data only on one of the two carriers, the pair of antennas and corresponding 2RX modulator configured for the other carrier may be used to receive and process data on the first carrier, thus enhance the receive performance gain.

Thus, the arrangement of the receiver processing apparatus 800 shown in FIG. 8 may be useful for a multicarrier capable UE that can support 2Rx per carrier but cannot support 4 Rx processing for a single carrier. In an aspect, the frontend processing by the two processing blocks 702a and 702b may be same as with two carriers but the LLRs/soft symbol estimates may be combined before the backend processing as they correspond to the same symbols/bits.

It may be noted that, although the example of FIG. 8 shows the receiver processing apparatus 800 including four input antennas and two processing blocks each processing for two receive antennas, the receiver processing apparatus 800 may include any number of receive antennas and may employ any number of receive processing blocks with each processing block capable of processing for any number of the receive antennas.

In certain aspects, the order in which the antennas 706a-d are connected to the inputs of the two processing blocks 702a and 702b may affect performance. Different performance levels may typically be achieved for different mappings of the antennas to the processing blocks depending on the channel conditions. For example, processing for antennas 706a and 706b mapped to processing block 702a and antennas 706c and 706d mapped to processing block 702b may differ from processing for antennas 706a and 706c mapped to processing block 702a and antennas 706b and 706d mapped to processing block 702b.

Thus, in certain aspects, a further enhancement to the processing apparatus 800 may include an antenna selection (AS)/ receive beamforming (BF) block before the MIMO processing blocks 702a and 702b. In an aspect, for OFDM systems, the AS/BF block may be added prior to Fast Fourier Transforms (FFTs) or post FFTs. The UE generally maintains an estimate of the channels to all receive antennas. Thus, each antenna to processing block mapping may be chosen based on the expected performance. In an aspect, given the estimated channels, an antenna to processing block mapping combination may be chosen that provides the best performance. In an aspect, the mapping may also be determined based on other properties of the antennas such as antenna imbalances, antenna correlation structure, etc. For example, with 4Rx antennas, if two of the antennas are highly correlated to each other while correlation for all other pairs of antennas is low, mapping the two highly correlated antennas to different processing blocks may be desirable.

Figure 9:
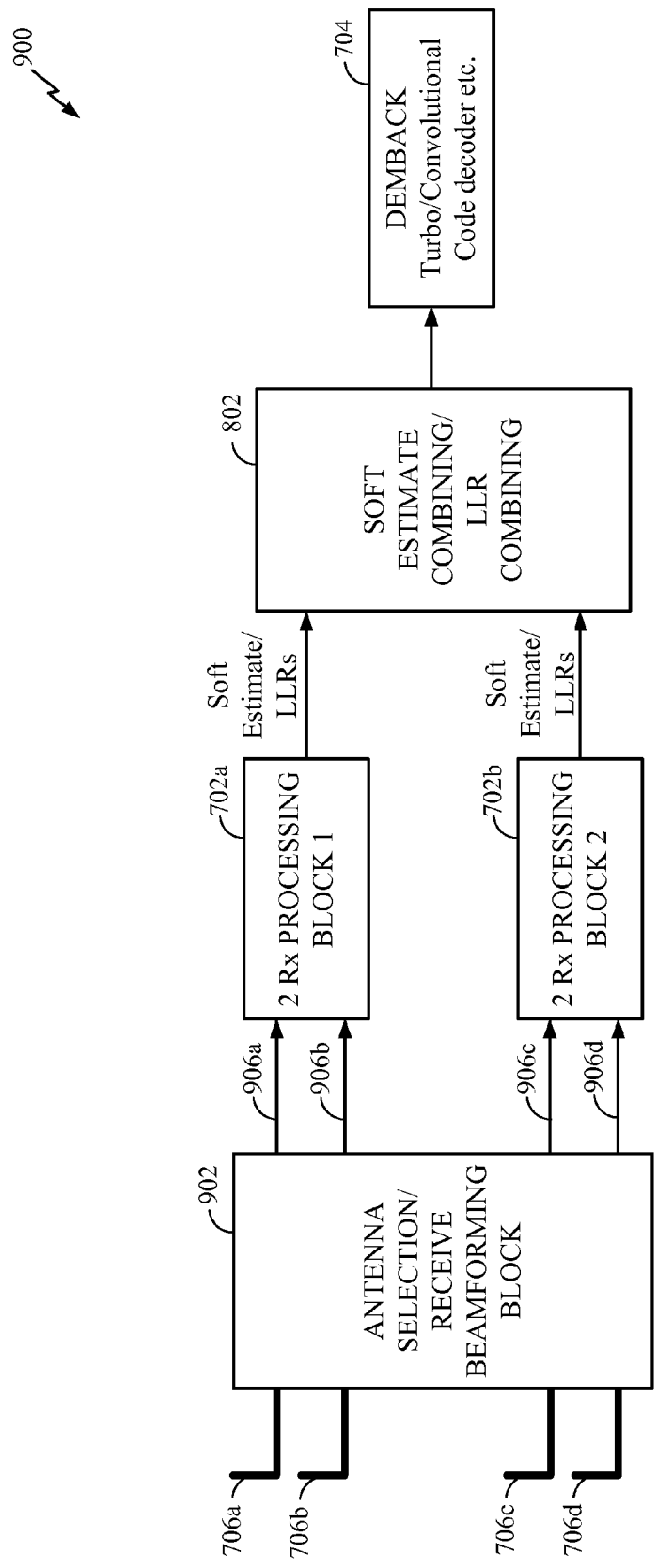
FIG. 9 illustrates a receiver processing apparatus which utilizes antenna selection (AS)/receive beamforming (BF), in accordance with certain aspects of the present disclosure.

FIG. 9 illustrates a receiver processing apparatus 900 which utilizes antenna selection (AS)/receive beamforming (BF), in accordance with certain aspects of the present disclosure. AS/BF block 902 maps the samples from the four receive antennas 706a-706d to four virtual receive antennas 906a-906d such that the expected performance with the four virtual receive antennas is better than the straightforward mapping of the receive antennas 706a-706d to the RX processing blocks 702a and 702b.

It may be noted that, although FIG. 9 shows four input antennas and four output antennas for the AS/BF block 902, in general the receiver processing apparatus may have different number of input and output receive antennas.

In certain aspects, if two modulation symbols are transmitted by a serving base station and two interfering modulation symbols are transmitted from an interfering base station, each of the four receive antennas 706a-706d at the receiver may receive the four modulation symbols. In certain aspects, the interfering modulation symbols may be cancelled by linearly combining the four receive antennas. This method is typically referred to as interference nulling.

Thus, in alternative aspects, mapping of the receive antennas 706a-706d to the virtual receive antennas 906a-906d may include beamforming for interference nulling. In this aspect, each input of the processing units 702a and 702b may be mapped to a linear combination of one or more of the antennas 706a-706d. For example, virtual antenna 906a may be mapped to a linear combination of all four receive antennas 706a-706d and, virtual antenna 906b may be mapped to a linear combination of receive antennas 706a and 706b. In certain aspects, this linear combination can be chosen based on the eigen decomposition of the estimated channel covariance matrix.

In an aspect, if a rank for the interferer is less than the number of receive antennas, some beams may be selected such that interference is significantly reduced on those beams. Passing such beams to the MIMO processing units may provide significant gains especially if the interference is colored (e.g., rank <#Rx antennas).

In certain aspects, other mappings may include receive delay diversity where samples from different antennas are delayed and combined.

In certain aspects, the antenna selection/Beam selection (or beam forming) may be expensive procedures since more processing resources (e.g. hardware) may need to be allocated as compared to normal receive processing. Thus, in certain aspects, these procedures may be carried out only occasionally or in certain scenarios, e.g when more gain may be achieved or power is not a limitation. For example, the beam may be selected once every 50 ms and kept the same till the next beam selection. The beam selection algorithm may need occasional channel/interference knowledge. For example, channel for all 4 Rx antennas, full 4 Rx interference covariance matrix. In an aspect, some additional processing may be added to make these available.

In certain aspects, in order to save processing resources and/or power, one or two best antennas or linear combinations of the antennas may be selected and mapped to the inputs of one of the processing units and the other processing unit may be turned off.

In certain aspects, switching between one or more modes including single MIMO processing block, single MIMO processing with antenna selection/receive beamforming, multiple MIMO processing blocks, multiple MIMO processing blocks with antenna selection/receive beamforming and selecting the combining scheme within the AS/BF block etc. may be based on one or more parameters.

For example, the switching between modes may be based on Doppler Spread. In an aspect, since AS/BF are done based on previously estimated channel and interference covariance, they may not work well if the channel changes considerably over a short period of time due to high Doppler.

In an aspect, the switching between modes may be based on delay spread. For example, beam forming may only work well if channel is not very frequency selective, for example, since the same beam has to be used across all frequency. In an aspect, the bandwidth can be split into narrow subbands and a different beam computed for each subband.

In an aspect, the switching between modes may be based on number of channel taps. In an aspect, if there are a lot of channel taps BF may not work. BF tries to find a strong channel tap and align the channel taps across the four receive antennas to have the same phase. If there are a lot of channel taps, then aligning the strongest channel tap to the correct phase may not help.

In an aspect, the switching between modes may be based on expected gains. In an aspect, if AS/BF or using two processing blocks may not help increase expected gain, they may not be used.

In an aspect, the switching between modes may be based on power constraints. For example, the enhanced procedures may only be used for devices that do not have power limitations (e.g., devices plugged in to power sources) or when the throughput gains justify the increased power usage. For example only if power per received bit is better.

In an aspect, the switching between modes may be based on bandwidth. In an aspect, as the bandwidth increases, the gain resulting from AS/BF decreases. Also, the amount of processing increases with increasing bandwidth and HW may not be able to support the increased processing load. Thus, these procedures may be switched off for higher bandwidth operation.

In an aspect, the switching between modes may be based on properties of interference such as interference rank. In an aspect, interference nulling may be effective only when rank of the interferer(s) is less than the number of antennas. Thus, BF may or may not be used based on the rank of the interferer(s).

In an aspect, the switching between modes may be based on transmission mode. LTE typically has different transmission modes and expected performance of different transmission modes is typically different. Thus these enhanced procedures may be switched on or off based on the transmission mode.

In an aspect, the switching between modes may be based on UE State, e.g., idle or connected state. For example, these features may be disabled for the Idle mode and enabled for the connected mode.

In an aspect, the switching between modes may be based on buffer status. In an aspect, the features may be enabled or disabled based on the amount of data in the buffer.

In an aspect, the switching between modes may be based on a type of traffic. For example, if the data is not delay sensitive, there may be no need to optimize processing and enable these procedures.

In an aspect, the switching between modes may be based on a multiplexing scheme, e.g. Time Division Duplex (TDD) or Frequency Division Duplex (FDD).

Figure 10:
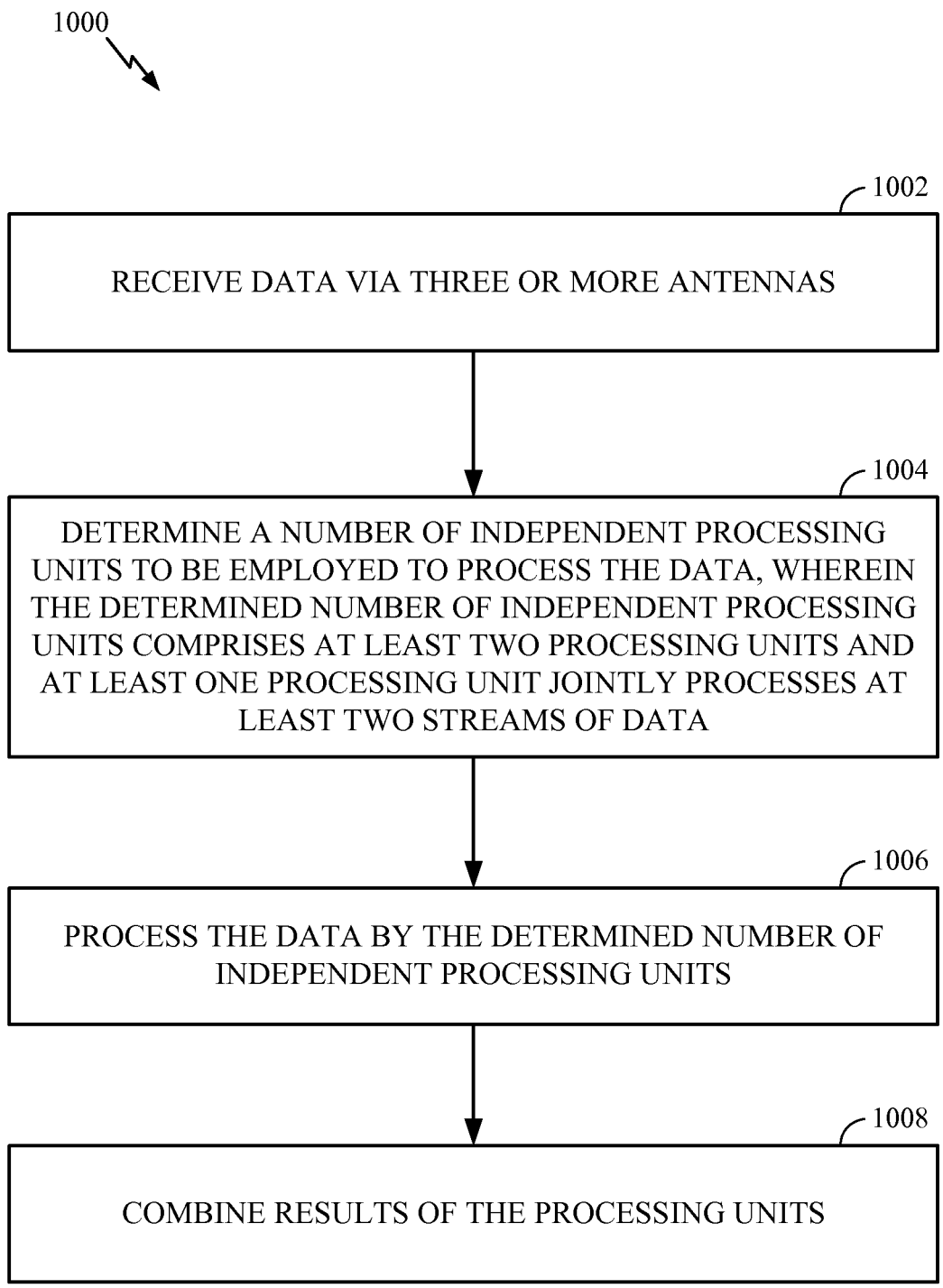
FIG. 10 shows a flow diagram illustrating operations by a user equipment (UE) for providing multi-antenna enhancements using multiple MIMO processing units, in accordance with certain aspects of the present disclosure.

FIG. 10 shows a flow diagram illustrating operations 1000 by a user equipment (UE) for providing multi-antenna enhancements using multiple MIMO processing units, in accordance with certain aspects of the present disclosure.

Operations 1000 may begin, at 1002, by receiving data via three or more antennas. At 1004, a number of independent processing units may be determined to be employed to process the data, wherein the determined number of independent processing units comprises at least two processing units and at least one processing unit jointly processes at least two streams of data. At 1006, the data may be processed by the determined number of independent processing units. At 1008, results of the processing units may be combined.

In certain aspects, each of the at least two processing units is capable of processing the data received via a subset of the antennas, where at least one processing unit is capable of processing the data received by at least two of the antennas.

In certain aspects, each processing unit is capable of processing data received by a predetermined number of antennas. In an aspect, each processing unit is capable of processing data received by the same number of antennas (e.g., two antennas each).

In certain aspects, each processing unit includes a MIMO demodulator. In an aspect, the MIMO demodulator utilizes a MMSE demodulation scheme.

In certain aspects, the UE may evaluate at least one parameter relating to receiving the data, and decide, based on the evaluation, whether to independently process the data via the three or more antennas by employing the determined number of processing units. In an aspect, the at least one parameter may include at least one of Doppler spread, delay spread, number of frequency taps, expected gains, power constraints, bandwidth, interference rank, transmission mode, UE state, Signal to Noise Ratio (SNR), type of traffic or multiplexing scheme.

In certain aspects, the results of each of the processing units include soft estimates of modulation symbols. In an aspect, the UE may combine the results by obtaining LLRs for individual bits by each processing units, and combing the LLRs for individual bits obtained from each of the processing units. In an aspect, the combining may be based on a quality estimate of the soft estimates obtained by each of the processing units. In an aspect, the quality estimate may include a SNR. In an aspect, the soft estimates from each of the processing units may be combined by a MRC scheme.

In certain aspects, the UE may evaluate an estimate of received channel at each of the three or more antennas, and map each of the three or more antennas to one of the processing units based on the evaluation. In an aspect, the UE may evaluate at least one parameter relating to receiving the data, and decide whether to perform the mapping based on the evaluation. In an aspect, the at least one parameter may include Doppler spread, delay spread, number of frequency taps, expected gains, power constraints, bandwidth, interference rank, transmission mode, UE state, SNR, type of traffic or multiplexing scheme. In an aspect, the mapping is determined at least in part based on the antenna correlation structure. In alternative aspects, the mapping is determined at least in part based on the antenna gain imbalance across antennas.

In certain aspects, the UE may map at least one of the processing units to a linear combination of at least two of the three or more antennas.

In certain aspects, each of the at least two processing units processes data received over the same carrier.

In certain aspects, the UE may evaluate at least one parameter relating to receiving the data, and determine the number of processing units, whether to use a fixed mapping of antennas to the one or more processing units or a mapping that varies with channel conditions, whether the mapping is limited to one antenna or a linear combination of two or more antennas, or whether to introduce a delay between the antennas before combining samples from the two or more linearly combined antennas based on the evaluation.

In certain aspects, a determination on the number of independent processing units to employ is made separately for different physical channels. In an aspect, different number of independent processing units is employed for data channel and control channel.

Figure 11:
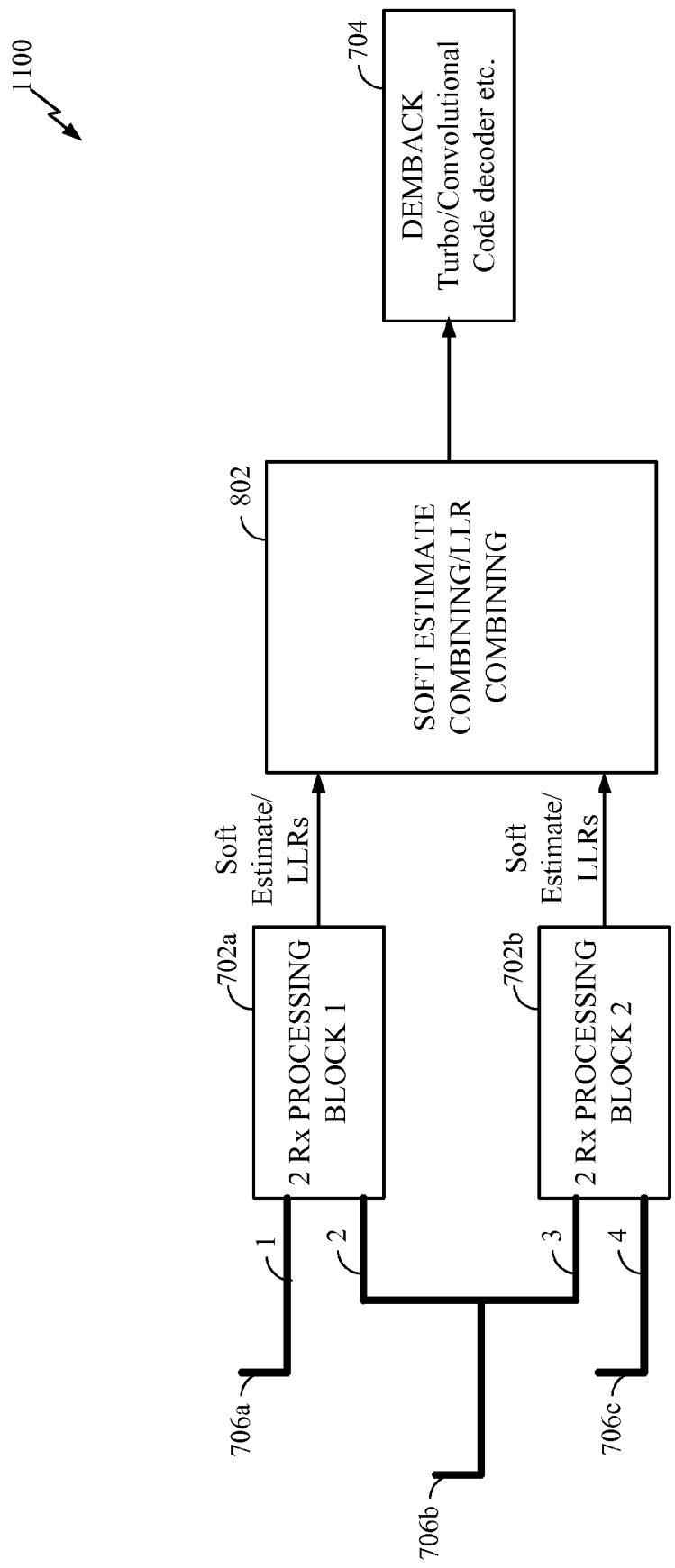
FIGS. 11 and 12 illustrate examples of using beamforming in combination with two processing blocks for three receive antenna cases, in accordance with certain aspects of the present disclosure.
Figure 12:
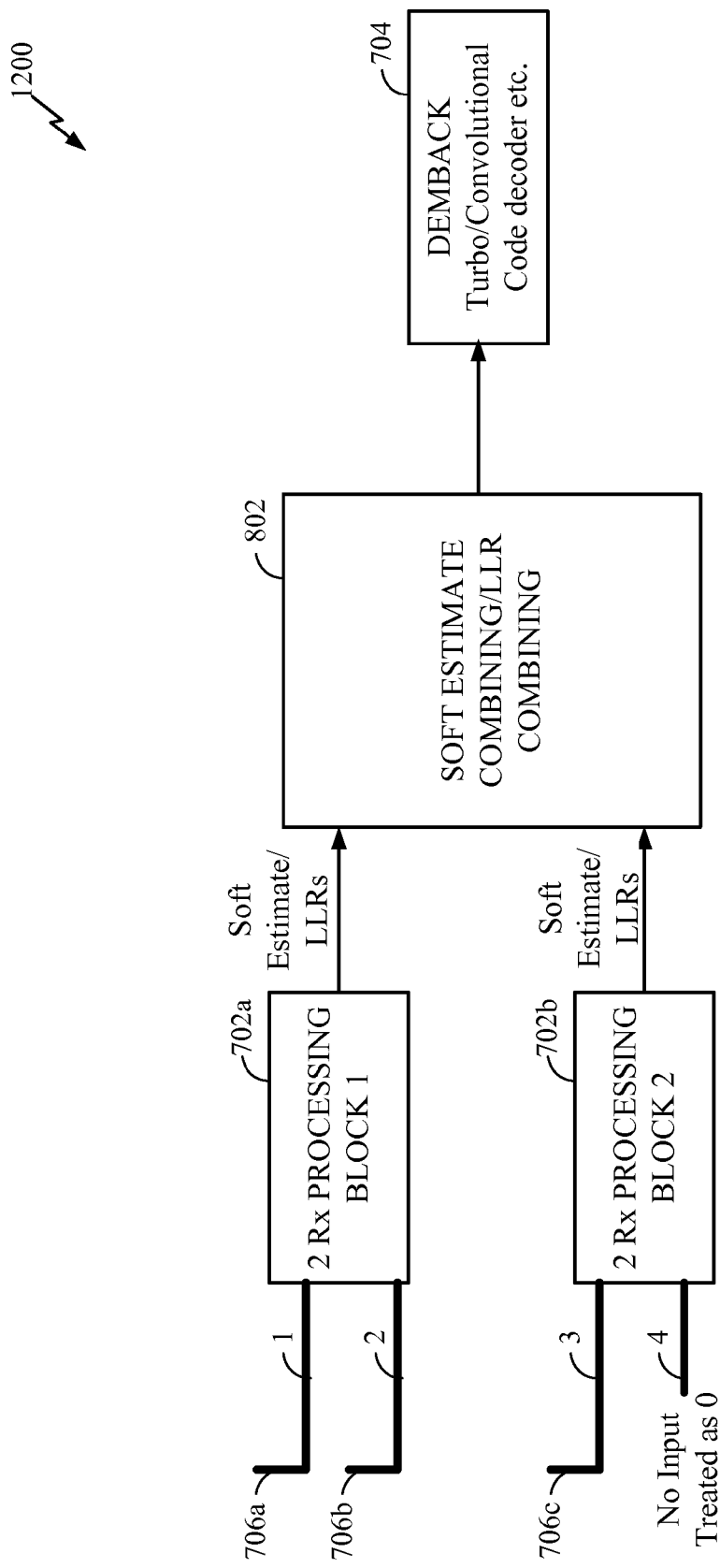

FIGS. 11 and 12 illustrate examples of using beamforming in combination with two processing blocks for the 3 receive antenna cases, in accordance with certain aspects of the present disclosure. In an aspect, the beamforming operation may be written as B·x, i.e. a multiplication of a 4×3 beamforming matrix B with input signal from the three receive antennas x. In FIG. 11 a repetition mapping is used. The beamforming matrix is [1 0 0; 0 1 0; 0 1 0; 0 0 1] which maps the first receive antenna 706*a* to output antenna 1, maps the second receive antenna 706*b* to output antennas 2 and 3, and maps the third input antenna 706*c* to the output antenna 4. In FIG. 12, mapping with nulling is used. The beamforming matrix is [1 0 0; 0 1 0; 0 0 1; 0 0 0] which maps the first three receive antennas 706*a*-706*c* to the first 3 output antennas 1-3 respectively, while the output antenna 4 is set to 0, In presence of white noise, the repetition mapping is expected to perform better when UE is scheduled with rank 2 while the mapping with nulling is expected to perform better when UE is scheduled with rank 1. In an aspect, the mapping may be fixed or adapted based on the transmission mode, SNR, channel conditions etc to optimize the performance.

In certain aspects, the demodulation front processing enhancements for different channels may be different. Due to hardware constraints for example it may be possible to use the LLR combining scheme with multiple processing blocks for PDSCH but not for PDCCH. Thus PDSCH may be processed using the LLR combining scheme depicted in FIG. 8 but not PDCCH. In another example, antenna selection may be performed for PDCCH and LLR combining with multiple processing blocks for PDSCH.

In certain aspects, due to enhancements to the demodulation front end, the UE may be capable of successfully decoding higher data rates than by using a single two Rx demodulator chain alone. Consequently, the channel state information (CSF) fed back from the UE to the eNB may need to be updated to reflect this enhanced capability. In an aspect, the UE can make use of the CSF computed by each Rx chain to create an overall CSF report. For example, the UE may compute a weighted sum of the CQI (channel quality information) and use that to create the CSF report. The weights may be chosen to reflect the quality of the processing chains.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
   receiving data via three or more antennas;
   determining a number of independent processing units to be employed to process the data, wherein the determined number of independent processing units comprises at least two processing units and at least one processing unit jointly processes at least two streams of data;
   processing the data by the determined number of independent processing units; and
   combining results of the processing units.

2. The method of claim 1, wherein each of the at least two processing units is capable of processing the data received via a subset of the antennas, at least one processing unit capable of processing the data received by at least two of the antennas.

3. The method of claim 1, wherein each of the processing units is capable of processing data received by a predetermined number of the antennas.

4. The method of claim 1, wherein each of the processing units is capable of processing data received by a same number of the antennas.

5. The method of claim 1, wherein each of the processing units comprises a Multiple Input Multiple Output (MIMO) demodulator.

6. The method of claim 5, wherein the MIMO demodulator utilizes a Maximum Mean Square Error (MMSE) demodulation scheme.

7. The method of claim 1, further comprising:
   evaluating at least one parameter relating to receiving the data; and
   deciding, based on the evaluation, whether to independently process the data received via the three or more antennas by employing the determined number of processing units.

8. The method of claim 7, wherein the at least one parameter comprises at least one of Doppler spread, delay spread, number of frequency taps, expected gains, power constraints, bandwidth, interference rank, transmission mode, UE state, Signal to Noise Ratio (SNR), type of traffic or multiplexing scheme.

9. The method of claim 1, wherein the results of each of the processing units comprises soft estimates of modulation symbols.

10. The method of claim 1, wherein combining the results comprises:
    obtaining Log Likelihood Ratios (LLRs) for individual bits by each of the processing units; and
    combining the LLRs for the individual bits obtained from each of the processing units.

11. The method of claim 9, wherein the combining is based on a quality estimate of the soft estimates obtained by each of the processing units.

12. The method of the claim 11, wherein the quality estimate comprises a Signal to Noise Ratio (SNR).

13. The method of claim 11, wherein the soft estimates from each of the processing units are combined by a Maximum Ratio Combining (MRC) scheme.

14. The method of claim 1, further comprising:
    evaluating an estimate of a received channel at each of the three or more antennas; and
    mapping each of the three or more antennas to one of the processing units based on the evaluation.

15. The method in claim 14, wherein the mapping is determined at least in part based on antenna correlation structure.

16. The method in claim 14, wherein the mapping is determined at least in part based on antenna gain imbalance across the antennas.

17. The method of claim 14, further comprising:
    evaluating at least one parameter relating to receiving the data; and
    deciding whether to perform the mapping, based on the evaluation.

18. The method of claim 17, wherein the at least one parameter comprises at least one of Doppler spread, delay spread, number of frequency taps, expected gains, power constraints, bandwidth, interference rank, transmission mode, UE state, Signal to Noise Ratio (SNR), type of traffic, or multiplexing scheme.

19. The method of claim 1, wherein the determination of the number of independent processing units to be employed is made separately for different physical channels.

20. The method of claim 18, wherein a different number of the independent processing units is employed for a data channel and a control channel.

21. The method of claim 1, further comprising:
    mapping at least one of the processing units to a linear combination of at least two of the three or more antennas.

22. The method of claim 21, further comprising:
    evaluating at least one parameter relating to receiving the data; and
    deciding whether to perform the mapping, based on the evaluation.

23. The method of claim 22, wherein the at least one parameter comprises at least one of Doppler spread, delay spread, number of frequency taps, expected gains, power constraints, bandwidth, interference rank, transmission mode, UE state, Signal to Noise Ratio (SNR), type of traffic, or multiplexing scheme.

24. The method of claim 1, wherein each of the at least two processing units processes data received over a same carrier.

25. The method of claim 1, further comprising:
    evaluating at least one parameter relating to receiving the data; and
    determining, based on the evaluation, a number of processing units, whether to use a fixed mapping of the antennas to one or more of the processing units or a mapping that varies with channel conditions, whether the mapping is limited to one of the antennas or a linear combination of two or more of the antennas, or whether to introduce a delay between the antennas before combining samples from the two or more linearly combined antennas.

26. The method of claim 25, wherein the at least one parameter comprises at least one of Doppler spread, delay spread, number of frequency taps, expected gains, power constraints, bandwidth, interference rank, transmission mode, UE state, Signal to Noise Ratio (SNR), type of traffic, or multiplexing scheme.

27. An apparatus for wireless communication, comprising:
    means for receiving data via three or more antennas;
    means for determining a number of independent processing units to be employed to process the data, wherein the determined number of independent processing units comprises at least two processing units and at least one processing unit jointly processes at least two streams of data;
    means for processing the data by the determined number of independent processing units; and
    means for combining results of the processing units.

28. The apparatus of claim 27, wherein each of the at least two processing units is capable of processing the data received via a subset of the antennas, at least one processing unit capable of processing the data received by at least two of the antennas.

29. An apparatus for wireless communication, comprising:
- a memory storing instructions;
- at least one processor coupled to said memory and configured to execute the instructions to:
  - receive data via three or more antennas;
  - determine a number of independent processing units to be employed to process the data, wherein the determined number of independent processing units comprises at least two processing units and at least one processing unit is configured to jointly process at least two streams of data;
  - process the data by the determined number of independent processing units; and
  - combine results of the processing units.

30. A non-transitory computer-readable medium storing code which when executed by a processor performs:
- receiving data via three or more antennas;
- determining a number of independent processing units to be employed to process the data, wherein the determined number of independent processing units comprises at least two processing units and at least one processing unit jointly processes at least two streams of data;
- processing the data by the determined number of independent processing units; and
- combining results of the processing units.

* * * * *